Feb. 13, 1962 M. E. LATTMANN 3,020,756
ACCURACY TESTING APPARATUS FOR ANTI-AIRCRAFT GUNS
Filed Aug. 26, 1957 3 Sheets-Sheet 3
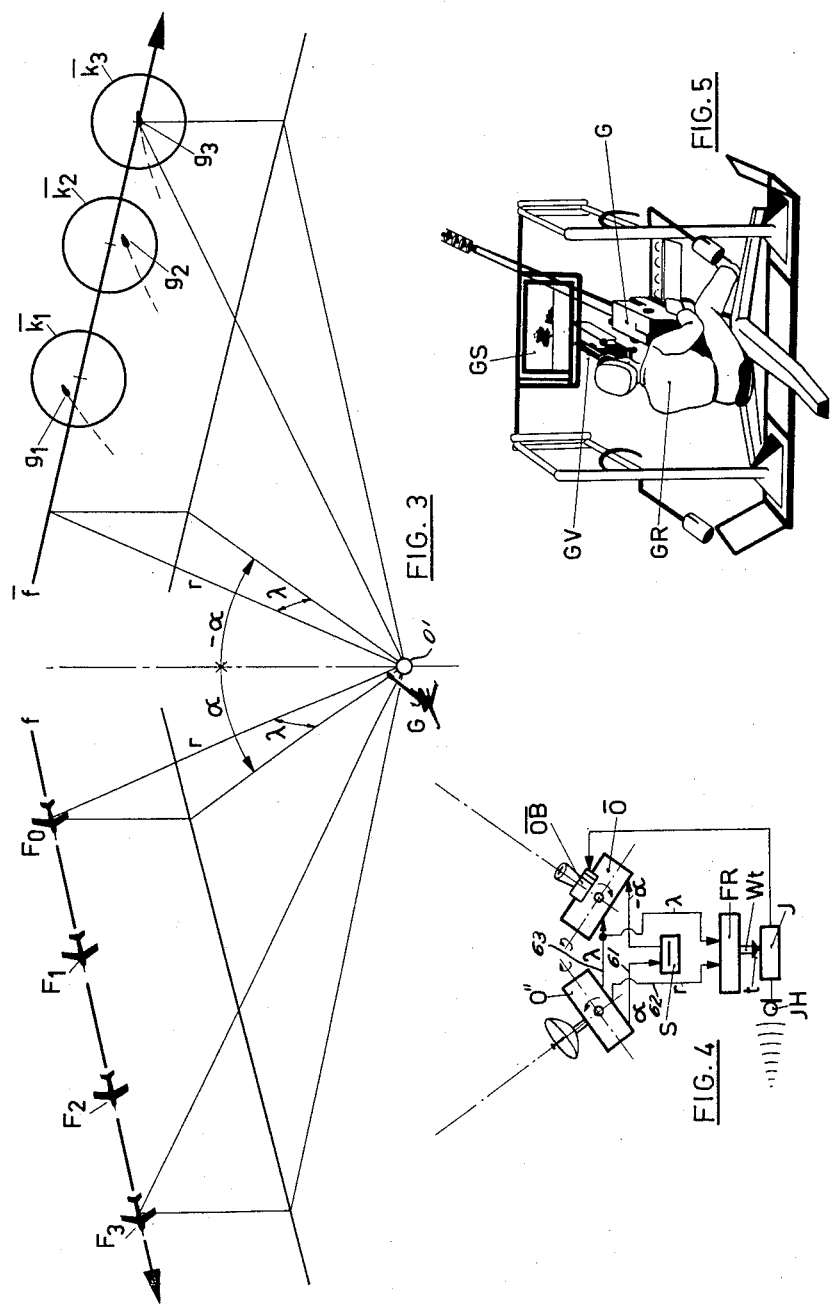

United States Patent Office 3,020,756
Patented Feb. 13, 1962

3,020,756
ACCURACY TESTING APPARATUS FOR ANTI-AIRCRAFT GUNS
Max E. Lattmann, Zurich, Switzerland, assignor to Firma Contraves A.G., Zurich, Switzerland
Filed Aug. 26, 1957, Ser. No. 685,770
14 Claims. (Cl. 73—167)

The present invention relates to a testing apparatus. More particularly, the present invention relates to an apparatus for testing and recording the accuracy of anti-aircraft gun installations.

In order to test the accuracy of gun emplacements and gun operators it is common practice, for anti-aircraft guns to fire at targets towed in the air. These provide moving targets for the guns. When time fuse explosive shells are used, the accuracy of the fired projectile can be ascertained relatively easily by observation of the relative positions of the exploded shell and the towed target. However, when firing small caliber anti-aircraft guns, small shells or projectiles are fired which do not have a time fuse. For such projectiles only the trajectory of the fired projectiles can be ascertained by tracers which are attached to some of the projectiles.

In such small caliber anti-aircraft guns a relatively large number of projectiles are fired by each of the guns in a relatively short time period. Therefore the tracers appear as a luminous straight line fired towards the towed target. All that can be ascertained in such installations is the approximate intersection of the trajectory of the fired projectiles with the target. What cannot be determined is the relative position of each of the projectiles with respect to the towed target as the projectile intersects the flight path of the target.

By means of the present invention it is possible to record a view of the fired projectile as the projectile intersects the flight path of the moving target.

It is accordingly an object of the present invention to provide a new and improved apparatus for testing and recording the accuracy of anti-aircraft gun installations.

A second object of the present invention is to provide a new and improved testing apparatus for checking the accuracy of small caliber anti-aircraft guns which fire a relatively large number of projectiles during short time periods.

Another object of the present invention is to provide a new and improved accuracy testing apparatus which provides a permanent record of a fired projectile as it intersects the flight path of a moving target.

A further object of the present invention is to provide a new and improved apparatus for photographing the position of a fired projectile relative to the flight path of the moving target at a preselected time interval after the projectile is fired from the anti-aircraft gun.

Still another object of the present invention is to provide a new and improved accuracy testing apparatus for anti-aircraft gun installations wherein the gun is aimed at and fired at the mirror image of a moving target.

Yet a further object of the present invention is to provide an accuracy testing apparatus for anti-aircraft guns wherein the projectile fired from the anti-aircraft gun is aimed at a mirror image of a moving target and wherein the apparatus photographs the fired projectile the instant that the projectile crosses the mirrored flight path of the moving target.

With the above objects in view, the present invention mainly consists of apparatus for testing the accuracy of anti-aircraft guns firing projectiles at a target moving along a flight path by recording the position of the fired projectile relative to the flight path of the moving target and including at least one gun aiming device controlling the aiming of the anti-aircraft gun being tested at the moving target as it moves along its flight path and providing electrical signals corresponding respectively to the coordinates of the instantaneous position of the target point with respect to the position of the gun being tested, impulse storing means responsive to the firing of the anti-aircraft gun for producing an impulse at the time a projectile is fired from the gun and for storing the impulse during an adjustable storing time interval, the storing means emitting an output impulse at the end of the storing time interval, computer means responsive to the electrical signals produced by the gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during said flight time, and photographic recording means oriented at said target jointly with said aiming device and responsive to the emitted output impulse for recording, at the end of the adjusted storing time interval, the position of the projectile relative to the moving target.

In a preferred embodiment of the present invention, the recording means includes a camera having an impulse operated shutter actuating mechanism. The impulse emitted from the storing means opens the shutter of the camera at the desired instant to photograph the projectile as it intersects the flight path of the moving target.

In order to store the recorded impulse during the storing time interval, a tape recorder having spaced recording and reproducing heads is utilized. The tape is moved past the recording and reproducing heads at a constant velocity so that the storing time interval can be varied by changing the length of the tape between the recording and reproducing heads.

In still another preferred embodiment of the present invention, apparatus is provided for producing a mirror image of the moving target. The anti-aircraft gun is aimed at and fired at this mirror image while a camera photographs the instant that the fired projectile intersects the mirror image of the flight path of a moving target.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a perspective diagrammatic view of an anti-aircraft gun installation firing at the mirror image of a moving target;

FIG. 4 is a diagrammatic view of some of the control apparatus used with the arrangement of FIG. 3; and FIG. 5 is a diagrammatic view of an anti-aircraft gun which is aimed at and fired at the mirror image of the moving target.

Figure 1:
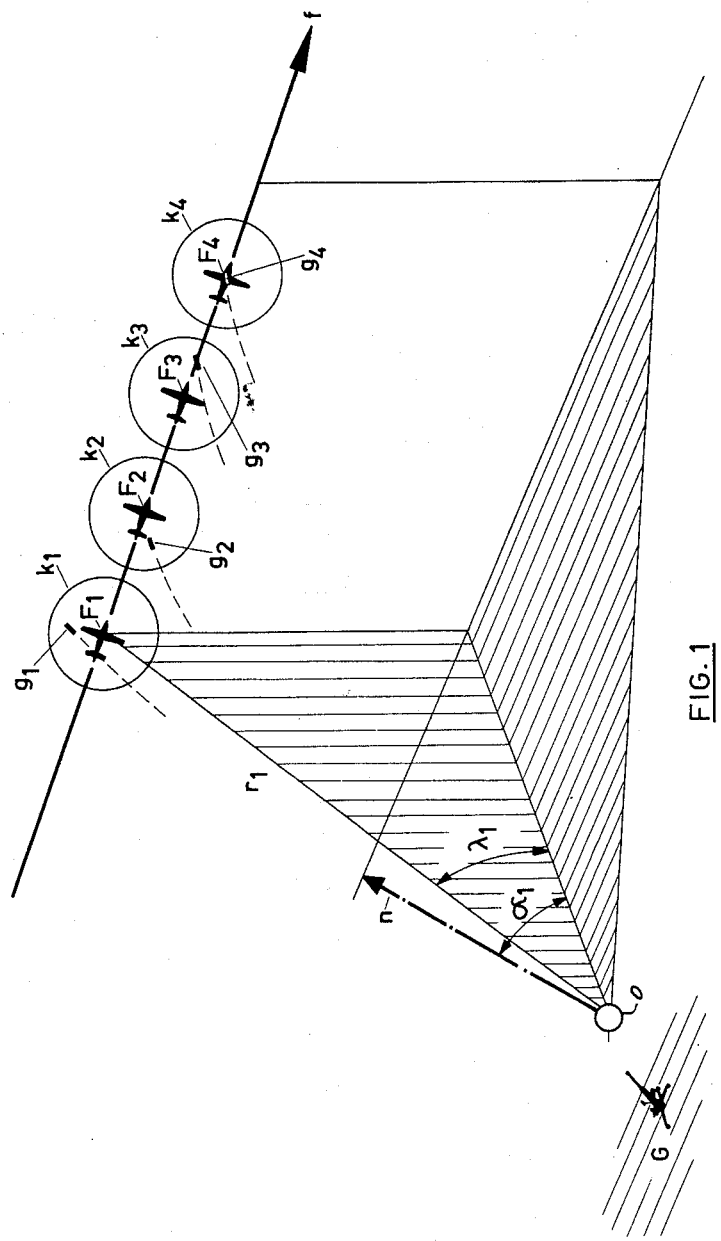
FIG. 1 is a perspective diagrammatic view of a gun emplacement firing at a moving target.

Referring to the drawings and more particularly to FIG. 1 an anti-aircraft gun G is shown arranged to fire projectiles at a moving target proceeding along a flight path *f*. A gun aiming device is arranged at position O for aiming the gun at the moving target. The aiming device may be at the same position as the gun, if desired. In either event correction is made at the gun aiming device for any difference in position between the aiming device and the gun.

Figure 2:
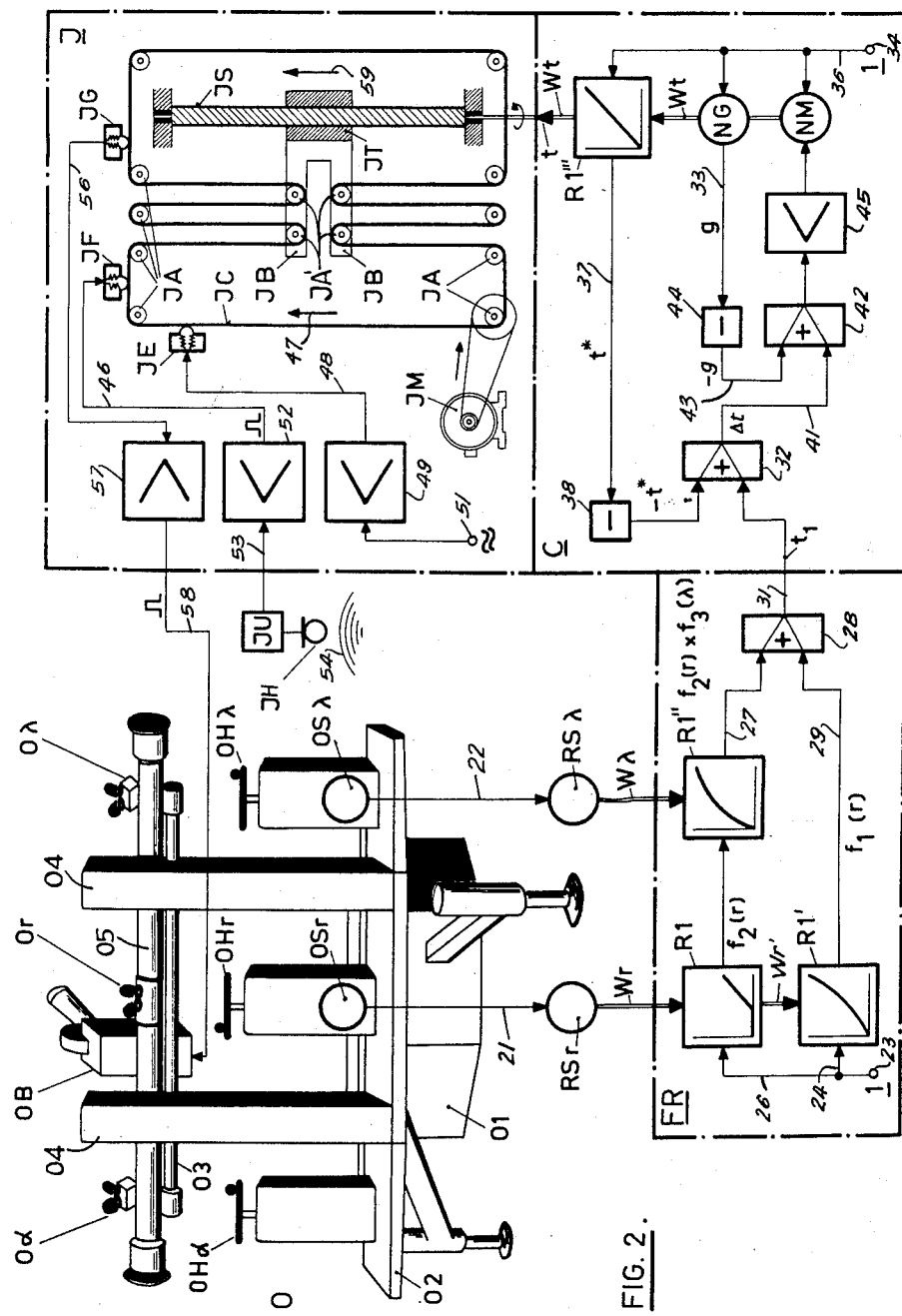
FIG. 2 is a diagrammatic view of the control equipment utilized with the anti-aircraft gun and showing some of the apparatus in an electrical schematic diagrammatic view.

As will be further explained with respect to FIG. 2, the gun aiming device provides output signals which correspond respectively to the coordinates of the moving target with respect to the position of the gun aiming device and the position of the anti-aircraft gun. As is apparent in FIG. 1 these coordinates include an azimuthal angle $\alpha$, an elevational angle $\lambda$, and the distance from the aiming position to the moving target indicated by the line $r$. For example at the position F1, the moving target has the coordinates $\alpha_1$, which is measured from an arbitrary reference line $n$; the elevational angle $\lambda_1$ which is measured from the horizontal plane; and the distance $r1$.

Since the target is moving continuously it is apparent that the coordinates of the target with respect to the position of the gun will be continuously changing.

Referring now to FIG. 2 it can be seen that a gun aiming device of generally conventional type, as described in the copending application Serial No. 537,138, is provided at the position O and includes a platform O2 which is rotatably mounted about a vertical axis on a tripod base O1. Arranged on the platform O2 is a horizontal shaft O3 which is journalled in columns O4 for rotation about its horizontal axis. Mounted on the shaft O3 is a telemeter O5 carrying an azimuth aiming telescope O$\alpha$, an elevation aiming telescope O$\lambda$, and the telemeter oculars O$r$ through which the distance $r$ from the gun aiming device to the moving target can be read. Also mounted for rotation with the horizontal rotatable shaft O3 and with platform O2 about its vertical axis is a camera OB having a shutter releasing mechanism which can be remotely operated by the transmission of electrical impulses thereto. The telescopes are represented diagrammatically by a box with two oculars.

Also mounted in conventional manner on the platform O2 are adjustment wheels OH$\alpha$, OH$r$ and OH$\lambda$. It is well known in the art that each of these adjustment wheels serve to aim the above mentioned optical devices at the target by controlling respectively the angular positions of the platform O2 and of the rotatable shaft O3 with respect to the azimuthal and elevational angles, respectively, and to operate the telemeter O5 to find the distance to the moving target. By this means, simultaneously the camera OB is continuously directed at the moving target and is continuously focused thereon.

The gun aiming device shown in FIG. 2 and described hereinabove is a conventional type which is known in the gun aiming art. With this device, it is possible to keep the moving target appearing at the crosshairs of the gun aiming telescopes O$\alpha$ and in the O$\lambda$ so that this target is precisely located at the intersection of the crosshairs.

Arranged on the platform O2 of the gun aiming device and cooperating with the hand wheel OH$r$ is a synchro transmitter OS$r$ which transmits an electrical signal by means of a conductor 21 to a synchro receiver RS$r$. A second synchro transmitter OS$\lambda$ is also arranged on the platform O2 which is controlled by the hand wheel OH$\lambda$. The transmitter OS$\lambda$ transmits an electrical signal on a conductor 22 to a second synchro receiver RS$\lambda$. Synchro transmitters and synchro receivers (Selsyn systems) are will known to the art and described for instance in "Standard Handbook for Electrical Engineers," McGraw-Hill Book Co., 1941, pages 690 and 737, and in the reference literature cited there.

In accordance with such conventional selsyn servo-mechanism arrangements a hand wheel rotates a shaft which changes the phase position of the synchro transmitter so that the signal transmitted by the synchro transmitter is proportional to and corresponds to the position of the hand wheel shaft at any particular instant. The synchro receiver is responsive to this transmitted signal so that the phase position of its rotatable element is moved to correspond to the phase position of the rotatable element in synchro transmitter. A shaft is connected to the rotatable element in the synchro receiver so that the instantaneous angular position of the rotatable shaft of the synchro receiver corresponds precisely to the angular position of the rotatable shaft of the synchro transmitter. In this manner, the rotation of the hand wheels OH$r$ and OH$\lambda$ produces a corresponding rotation of the rotatable shafts controlled by the synchro receivers.

Referring to FIG. 2 it can be seen that the receiver RS$r$ is provided with an output rotatable shaft W$r$ and the receiver RS$\lambda$ is provided with an output rotatable shaft W$\lambda$. The rotatable shafts W$r$ and W$\lambda$ accordingly have an instantaneous angular position which corresponds respectively to the instantaneous angular position of the hand wheels OH$r$ and OH$\lambda$. It is possible for the hand wheels to be directly mechanically connected to the rotatable shafts without the interposition of the synchro transmitter and receiver. However, with the synchro system, it is possible to locate the rotatable shafts remotely from the gun aiming device at a more convenient position, if desired.

The rotatable shafts W$r$ and W$\lambda$ are input shafts for the time-of-flight computer FR of the general type described in my copending application Serial No. 315,615, now Patent No. 2,919,850. The shaft W$r$ is connected to a first computer R1 and is further connected to a second shaft W$r'$ which serves as the input shaft of a second ballistic computer R1'. The shaft W$r'$ is coupled to the shaft W$r$ and rotatable therewith. Applied to an input terminal 23 of the computer FR is a unit voltage $\underline{1}$ which is applied on conductors 24 and 26 to the conventional ballistic computers R1' and R1 respectively. The unit voltage $\underline{1}$ has a constant frequency of e.g. 400 c.p.s. and an amplitude that may be chosen to suit requirements and is multiplied (as described e.g. in application Serial No. 537,138) in each of the computers R1 and R1' by an amount which is a function of the angular position of the rotatable shaft W$r$.

The ballastic computers can include voltage divider rotary rheostats or rotary capacitors of the general type described in the copending application Serial No. 440,182, now Patent No. 2,891,378, which can be so modified as to provide proper computing characteristics for the computers depending on the ballistic characteristics of the projectiles being fired from the anti-aircraft gun and of the gun itself. Accordingly, at the output of the computer R1' is provided an output voltage corresponding to a voltage function $f_1(r)$. At the output of the computer R1 is provided an output voltage corresponding to a voltage function $f_2(r)$. These functions are based on the generally known ballistic approximative equation $$t = f_1(r) - f_2(r) \sin \lambda$$

where $t$ is the time of flight of a projectile.

The rotatable shaft W$\lambda$ is connected to a third computer R1''. This computer has the input voltage $f_2(r)$ applied thereto from computer R1 and multiplies this function by a voltage which is a function $f_3(\lambda)$ of the elevational angle $\lambda$. Therefore at the output of the computer R1'' is provided a voltage which is a function of the distance $r$ and the elevational angle $\lambda$ and accordingly has the form of a function $f_2(r) \times f_3(\lambda)$.

The output voltage from th computer R1'' is applied by means of a conductor 27 to the input of a conventional addition member 28. Also applied to the addition member 28 by means of a conductor 29 is the voltage output of the ballistic computer R1'. The sum of the voltages appearing on the output conductor 31 of the addition member 28 is $$f_1(r) + [f_2(r) \times f_3(\lambda)] = t_1$$

where $t_1$ represents the time-of-flight of the fired projectile from the moment it leaves the gun until the instant that it intersects the flight path of the moving target. It is apparent that the computed time-of-flight can readily take into account the incremental azimuthal and elevational angles which are the change in angles of the moving target with respect to the anti-aircraft gun during the time-of-flight of the projectile.

The time $t_1$ is the time-of-flight of the projectile from the gun to the position F1 shown in FIG. 1 having the coordinates $\alpha_1$, $r_1$, and $\lambda_1$. This time-of-flight is obtained in a conventional addition member 28 as an alternating voltage wherein the amplitude is proportional to the time. This alternating voltage is applied on the output conductor 31 to a second conventional addition member 32 of control means C which forms part of the computer mechanism utilized in the present invention. All addition members of the device are of a type known e.g. in A.C. analog computers.

The control means C includes a follow-up motor NM which rotates a rotatable shaft W$t$ in response to control voltages applied to the motor. Mounted on the same shaft W$t$ is a generator NG which produces an output voltage $g$ on an output conductor 33, which voltage is proportional to the rotational speed of the shaft W$t$.

The shaft W$t$ controls a computer R''' (of the same type as R1 and R1') which has applied thereto the unit voltage $\underline{1}$. This unit voltage $\underline{1}$ is an alternating current voltage and is the same as the voltage applied to the input terminal 23 of the time-of-flight computer FR. It can be seen that the unit voltage is applied to the terminal 34 and from there on conductor 36 to the motor NM, the generator NG and the computer R1'''.

Due to the operation of the linear computer R1''', the unit voltage is in the known manner converted into a voltage $t\stackrel{*}{-}$ which has an amplitude that is proportional to and corresponds to the angular position of the shaft W$t$. The output voltage $t^*$ is applied on the conductor 37 to a phase inverter 38 (of the type well known in A.C. analog computers) where it is inverted and has the amplitude $-t^*$ which is applied on the conductor 39 to the addition member 32. In the addition member 32 a voltage $\Delta t$ is produced which is equal to the difference between the voltages $t_1$ and $t^*$.

The voltage $\Delta t$ is applied on a conductor 41 to a conventional addition member 42. Also applied to the addition member 42 is the voltage $-g$ on a conductor 43. The voltage $-g$ is obtained upon the application of the voltage $g$ appearing on the conductor 33 to the phase inverter 44 which is of the same type as 38.

The output of the addition member 42 has an amplitude $\Delta t - g$ and is applied to a conventional amplifier 45, the amplified output of which is applied as a control voltage to the motor NM. The voltage $g$ produced by the generator NG is a stabilizing voltage. Accordingly the motor NM adjusts the angular position of its output shaft W$t$ to a rotational angle which is proportional to the computed time-of-flight $t_1$.

The output shaft W$t$ is directly mechanically coupled to a threaded shaft JS of an impulse storer J. The threaded shaft JS is rotatably mounted in the impulse storer J and has threadedly mounted thereon a roller supporting member JB. The roller supporting member JB threadedly engages the shaft JS by means of an internally threaded member JT. Mounted on th roller supporting member JB are a plurality of rollers JA each of which are rotatable. In addition a further plurality of rollers JA is arranged on the impulse storer J in the manner shown.

An endless record carrier JC is mounted in the impulse storer J and engages each of the rollers JA' and JA which are arranged to maintain the endless record carrier JC under a predetermined tension. The record carrier JC which may be magnetic tape, for example, is moved by a motor JM with a constant lineal speed. The record carrier JC is moved in the direction of the arrow 47 past an erasing head JE, a recording head JF and a reproducing head JG in the recited order. Record carriers, recording heads, pick-up heads and erasing heads are entirely conventional and their operation known from the field of tape recorders.

The erasing head JE is connected by conductor 48 to the output of a conventional amplifier 49, the input of which is connected to an input terminal 51 for a constant amplitude alternating current voltage. The recording head JF is connected by means of a conductor 46 to the output of a conventional amplifier 52 the input of which is connected by means of a conductor 53 to a scaler JU. The scaler JU is a conventional apparatus including e.g. a counting tube which emits a single output impulse after a predetermined number of impulses have been applied to the input thereof.

The input of the scaler JU is connected to the output of a microphone JH which is arranged near the gun being tested and converts the sound waves 54 produced by the firing of the gun into the electrical impulses handled by the scaler JU. Finally, the reproducing or pick-up head JG is connected by means of a conductor 56 to the input of a conventional amplifier 57 the output of which is connected on a conductor 58 to the shutter actuating mechanism of the camera OB which is conventional and equipped with an ordinary shutter actuating mechanism responsive to electrical impulses.

In operation, each time the gun fires sound waves are produced at the instant the projectile is fired from the gun. These sound waves are converted into electrical impulses in the microphone JH and after a predetermined number of impulses are applied to the scaler JU, the scaler JU emits an impulse on the conductor 53 which is amplified in the amplifier 52 and applied to the recording head JF which records the impulse on the moving record carrier JC. This recorded impulse remains on the record carrier JC and is moved thereby until the reproducing head JG is reached.

At the reproducing head JG, the recorded impulse is reproduced and applied on the conductor 56 to the amplifier 57, the amplified output of which is applied on the conductor 58 to the shutter actuating mechanism of the camera OB. This operates the shutter of the camera to cause the same to photograph the moving target on which it is focused.

It is therefore seen that the impulse recorded by the recording head JF remains in the storer J for a storing time interval that is terminated when the impulse reaches the reproducing head JG. If this storing time interval equals the time-of-flight of the projectile from the gun to the target point defined by the coordinates based on which said time was computed, the camera will photograph the moving target at the exact instant that the projectile arrives at said target point. In this manner, the camera will provide a record of the relative positions between the projectile and the moving target at that instant.

The storing time interval which is the time during which the recorded impulse is stored in the storer J is determined by the length of the path followed by the record carrier JC between the recording head JF and the reproducing head JG. It can be seen that the length of this path is determined by the relative position of the roller supporting member JB on the threaded shaft JS. If the roller supporting member JB is moved in the direction of the arrow 59 this path is made smaller and the storing time interval is accordingly made shorter. On the other hand the storing time interval is increased if the roller supporting member JB is moved along the shaft JS in the opposite direction.

It is apparent that the total length of the record carrier JC remains the same because of the looped path of the carrier JC around the rollers JA' on the roller supporting member JB. As the rollers JA' on one arm of the member JB increase the length of the loops of the record carrier, the opposing rollers on the other arm of the member JB decrease the length of the other loops of the record carrier without changing the fixed length of the record carrier.

In accordance with the present invention the length of the path followed by the record carrier between the recording head JF and the reproducing head JG is controlled by the angular position of the output shaft W$t$ of the motor NM. This angular position in turn is controlled by the output voltage of the computer FR, which output voltage is proportional to the time-of-flight of the projectile.

Therefore in overall operation of the apparatus, the gun aiming device O is aimed at the moving target and the hand wheels thereof are continuously varied to keep the moving target precisely at the intersection of the crosshairs of the aiming telescopes. The camera which is oriented with the telescopes is thereby maintained in focused relationship with the moving target and always takes a picture of the moving target and at least one moving projectile with the target in the center thereof. However, the camera does not take any pictures unless its shutter actuating mechanism is operated by an output impulse coming from the storer J.

The continuous movement of the hand wheels continuously changes the angular position of the input shafts to the time-of-flight computer FR so that its output voltage is always proportional to the time-of-flight of the projectile from the gun to the flight path of the moving target. This output voltage controls the motor NM which changes the angular position of its output shaft W$t$ so that the same is always proportional to the calculated time-of-flight. Therefore, the threaded shaft JS of the storer J always maintains the roller supporting member JB at the proper axial position along the shaft JS so that the length of the path followed by the record carrier JC between the heads JF and JG produces a storing time interval equal to the computed time-of-flight. In this manner the impulse produced by the reproducing head JG is applied to the shutter actuating mechanism of the camera OB precisely at the instant that the projectile arrives at the target point the coordinates of which were used for computing said time-of-flight.

The scaler JU is necessary only when the anti-aircraft gun fires projectiles at very high repetition rates in the order of 1000 shots per minute or more. With such rapid fire guns, it might not be possible to take such a large number of pictures, each of which corresponds to a single projectile fired at the target. At lower rates however, with the scaler JU omitted each projectile fired from the gun produces an impulse which is recorded by the recording head so that the camera photographs the intersection of each projectile with the flight path of the moving target.

It is clear that with the scaler JU, the camera would photograph only one projectile out of each series of predetermined number fired. For example, it could be arranged to photograph every fifth or every tenth projectile.

In FIG. 1 examples of the photographs taken by the camera are indicated by the circles $k1$–$k4$. In the circle $k1$, it can be seen that the projectile $g1$ is too high and lags behind the moving target $F_1$. In the circle $k2$, the projectile $g2$ is too low and lags behind the moving target $F_2$. In the circle of photograph $k3$, the projectile $g3$ is ahead of the target $F_3$ and in the circle $k4$ the projectile $g4$ is directly on the target $F_4$.

Accordingly it can be seen that the apparatus incorporating the principles of the present invention provides an arrangement for testing the devices used to control the gun, the gun aimer and the efficiency of the gun crew.

In FIG. 2, the heads JF and JG are provided with the proper energizing potentials in conventional manner when necessary and are not illustrated in more detail in order to avoid unnecessarily complicating the drawing. Also, the erasing head JE is utilized to erase the recorded impulses so that the record carrier JC will be free to have a new impulse recorded thereon by the recording head JF.

Referring now to FIGS. 3–5 an arrangement is shown wherein the anti-aircraft gun can be aimed at and fired at the mirror image of the moving target. In FIG. 5 the gun operator GR is shown aiming the gun G by means of the gun aiming device GV at an image of the moving target, which image is displayed on the mirror GS. This arrangement has the advantage that an ordinary airplane can be used as the moving target without the necessity of towing a separate target or of using remotely controlled planes.

As shown in FIG. 3, in this embodiment, the gun G and the aiming device GV are arranged at the same location O'. A second aiming device is also located at the same location and accurately tracks the actual moving target following the flight path $f$. The gun itself however is aimed at the mirror image of the moving target (as shown in FIG. 5) which has an azimuthal angle $-\alpha$ symmetrically equal to the azimuthal angle $\alpha$ of the actual moving target.

The camera $\overline{OB}$ however is directly focused on the mirror image $\bar{f}$ of the flight path $f$. This is accomplished by the arrangement shown in FIG. 4. A conventional radar tracking device O'' is provided which continuously follows the moving target and provides the actual polar coordinates $\alpha$, $r$ and $\lambda$. As in the previously described example, output voltages representing these coordinates are delivered via the output conductors 61, 62 and 63 respectively. However, the voltage representing $\alpha$ is fed from the tracking device O'' to a conventional converter S so as to be converted into the mirror image voltage $-\alpha$ and this is applied to the photo tracking device $\overline{O}$ to which the voltage $\lambda$ is applied directly. Thus, the device $\overline{O}$, through conventional control means, is caused to be oriented to follow the mirror image of the target $\bar{f}$ (FIG. 3). As before, the output voltages corresponding to the distance $r$ and the elevational angle are applied to the time-of-flight computer FR (FIG. 2) which emits an output voltage proportional to the time-of-flight of the projectile. This output voltage is applied to the impulse storer J (FIG. 2) which produces a shutter operating impulse for the camera $\overline{OB}$ as described above for camera OB. However, the output voltage appearing on the conductor 61 and corresponding to the azimuthal angle $\alpha$ is applied to a phase inverter S which produces an output voltage proportional to the azimuthal angle $-\alpha$ of the mirror image of the moving target in the same manner as explained above. This output voltage is applied to a direction aiming device for the camera $\overline{OB}$ equivalent to the devices O1–O5 in FIG. 1 so that this camera is always focussed on the mirror image of the flight path of the moving target. It is to be noted that an output voltage corresponding to the elevational angle $\lambda$ is also applied to the camera device.

Accordingly, in operation, the gun G of FIG. 5 is fired into the air as controlled by the gun aiming device GV which is sighted on the mirror image appearing in the mirror GS. The camera photographs each projectile as it intersects the theoretical mirror image of the flight path of the moving target. As can be seen in FIG. 3 photographs $\overline{k1}$, $\overline{k2}$, $\overline{k3}$ are obtained which are equivalent to the circles $k1$–$k4$ in FIG. 1.

The center of each circle corresponds to the position of the moving target so that the relative positions of the projectiles $g1$–$g3$ can be respectively seen by viewing the circles $\overline{k1}$–$\overline{k3}$.

In this manner it is possible to obtain accuracy testing records without actually firing the gun directly at the moving target.

If desired a second camera can also be arranged on the radar tracking device O'' and synchronized with the camera $\overline{OB}$ so that actual pictures of the moving target can be simultaneously obtained to make sure that the camera $\overline{OB}$ is accurately centered on the mirror image $\bar{f}$ of the flight path $f$ of the moving target.

As mentioned hereinabove the gun aiming device may either be located directly at the anti-aircraft gun installation or at some remote location with the proper factors being introduced in the computer functions to allow for any parallax due to the different positions of the gun and aiming device.

It is also possible by using conventional computer devices to determine the magnitude of the distance $r$ between an observation point and a target by obtaining azimuthal and elevational angles from two theodolite instruments which are placed a preselected distance from each other. In such an arrangement the two theodolites and the associated computer would form a gun aiming device for ascertaining the polar coordinates of the instantaneous position of the moving target with respect to the position of the gun.

It will be understood that each of the elements described above, or two or more together, may also find a useful application in other types of testing apparatus differing from the types described above.

While the invention has been illustrated and described as embodied in an accuracy testing apparatus for anti-aircraft guns, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for testing the accuracy of anti-aircraft guns firing projectiles at a target moving along a flight path by recording the position of the fired projectile relative to the flight path of the moving target, comprising, in combination, at least one gun aiming device controlling the aiming of the anti-aircraft gun being tested at the moving target as it moves along its flight path and providing electrical signals corresponding respectively to the coordinates of the instantaneous position of the moving target with respect to the position of the gun being tested; impulse storing means responsive to the firing of the anti-aircraft gun for producing an impulse at the time a projectile is fired from the gun and for storing said impulse during an adjustable storing time interval, said storing means emitting an output impulse at the end of said storing time interval; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during said flight time and photographic recording means oriented at said target jointly with said aiming device and responsive to said emitted output impulse for recording, at the end of said storing time interval as adjusted, the position of the projectile relative to said moving target.

2. Apparatus for testing the accuracy of anti-aircraft guns firing projectiles at a target moving along a flight path by recording the position of the fired projectile as it intersects the flight path of the moving target, comprising, in combination, at least one gun aiming device controlling the aiming of the anti-aircraft gun being tested at the moving target as it moves along its flight path and providing electrical signals corresponding respectively to the coordinates of the instantaneous position of the moving target with respect to the position of the gun being tested; impulse storing means responsive to the firing of the anti-aircraft gun for producing an impulse at the time a projectile is fired from the gun and for storing said impulse during an adjustable storing time interval, said storing means emitting an output impulse at the end of said storing time interval; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates at the instantaneous positions of said target as they vary during said flight time so that said storing time interval always equals the computed time of flight of the projectile between said gun and the target point defined by said coordinates and photographic recording means oriented at said target jointly with said aiming device and responsive to said emitted output impulse for recording, at the end of said storing time interval as adjusted, the position of the projectile relative to said moving target.

3. Apparatus for testing the accuracy of anti-aircraft guns firing projectiles at a target moving along a flight path by recording the position of the fired projectile relative to the flight path of the moving target, comprising, in combination, at least one gun aiming device controlling the aiming of the anti-aircraft gun being tested at the moving target as it moves along its flight path and providing electrical signals corresponding respectively to the coordinates of the instantaneous position of the moving target with respect to the position of the gun being tested; impulse storing means including microphone means responsive to the firing of the anti-aircraft gun for producing an electrical impulse at the time a projectile is fired from the gun and for storing said impulse during an adjustable storing time interval, said storing means emitting an output electrical impulse at the end of said storing time interval; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during said flight time; and photographic recording means oriented at said target jointly with said aiming device and responsive to said emitted output electrical impulse for recording, at the end of said storing time interval as adjusted, the position of the projectile relative to said moving target.

4. Apparatus for testing the accuracy of anti-aircraft guns firing projectiles at a target moving along a flight path by recording the position of the fired projectile relative to the flight path of the moving target, comprising, in combination, at least one gun aiming device controlling the aiming of the anti-aircraft gun being tested at the moving target as it moves along its flight path and providing electrical signals corresponding respectively to the coordinates of the instantaneous position of the moving target with respect to the position of the gun being tested; impulse storing means including an endless record carrier means adapted to have impulses recorded thereon, means for moving said carrier means at a constant velocity, recording means responsive to the firing of the anti-aircraft gun for recording an impulse on said record carrier at the time a projectile is fired from the gun, reproducing means spaced from said recording means and arranged along said record carrier means for producing and emitting an electrical output impulse from said recorded impulse after the same has been moved along an adjustable length of path by said sound carrier means, and varying means for varying the length of said path; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during said flight time; and photographic recording means oriented at said target jointly with said aiming device and responsive to said emitted output impulse for recording the position of the projectile relative to said moving target when said output impulse is emitted from said storing means.

5. Apparatus for testing the accuracy of anti-aircraft guns firing projectiles at a target moving along a flight path by recording the position of the fired projectile relative to the flight path of the moving target, comprising, in combination, at least one gun aiming device controlling the aiming of the anti-aircraft gun being tested at the moving target as it moves along its flight path and providing electrical signals corresponding respectively to the coordinates of the instantaneous position of the moving target with respect to the position of the gun being tested; impulse storing means including an endless record carrier means adapted to have impulses recorded thereon, means for moving said carrier means at a constant velocity, recording means responsive to the firing of the anti-aircraft gun for recording an impulse on said record carrier at the time a projectile is fired from the gun, reproducing means spaced from said recording means and arranged along said record carrier means for producing and emitting an electrical output impulse from said recorded impulse after the same has been moved along an adjustable length of path by said sound carrier means, varying means for varying the length of said path, and erasing means arranged along said sound carrier means for erasing said record impulse after said reproducing means has produced an electrical output impulse therefrom; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during said flight time; and photographic recording means oriented at said target jointly with said aiming device and responsive to said emitted output impulse for recording the position of the projectile relative to said moving target when said output impulse is emitted from said storing means.

6. Apparatus for testing the accuracy of anti-aircraft guns firing projectiles at a target moving along a flight path by photographing the position of the fired projectile relative to the flight path of the moving target, comprising, in combination, at least one gun aiming device controlling the aiming of the anti-aircraft gun being tested at the moving target as it moves along its flight path and providing electrical signals corresponding respectively to the coordinates of the instantaneous position of the moving target with respect to the position of the gun being tested; impulse storing means responsive to the firing of the anti-aircraft gun for producing an impulse at the time a projectile is fired from the gun and for storing said impulse during an adjustable storing time interval, said storing means emitting an output impulse at the end of said storing time interval; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during said flight time; and photographic means arranged on said gun aiming device so as to be continuously focused on the moving target, said photographic means including shutter actuating means responsive to said emitted output impulse for photographing, at the end of said storing time interval as adjusted, the position of the projectile relative to said moving target.

7. Apparatus for testing the accuracy of anti-aircraft guns firing projectiles at a target moving along a flight path by recording the position of the fired projectile relative to the flight path of the moving target, comprising, in combination, at least one gun aiming device controlling the aiming of the anti-aircraft gun being tested at the moving target as it moves along its flight path and providing at least three electrical output signals, two of said output signals corresponding respectively to the azimuthal and elevational angles of the instantaneous position of the moving target with respect to the position of the gun being tested, said third electrical output signal corresponding to the distance between the position of the gun and said instantaneous position of the moving target; impulse storing means responsive to the firing of the anti-aircraft gun for producing an impulse at the time a projectile is fired from the gun and for storing said impulse during an adjustable storing time interval, said storing means emitting an output impulse at the end of said storing time interval; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during flight time; and photographic recording means oriented at said target jointly with said aiming device and responsive to said emitted output impulse for recording, at the end of said storing time interval as adjusted, the position of the projectile relative to said moving target.

8. Apparatus for testing the accuracy of anti-aircraft guns firing projectiles at a target moving along a flight path by recording the position of the fired projectile relative to the flight path of the moving target, comprising, in combination, at least one gun aiming device controlling the aiming of the anti-aircraft gun being tested at the moving target as it moves along its flight path and providing at least three electrical output signals, two of said output signals corresponding respectively to the azimuthal and elevational angles of the instantaneous position of the moving target with respect to the position of the gun being tested, said third electrical output signal corresponding to the distance between the position of the gun and said instantaneous position of the moving target; impulse storing means including an endless record carrier means adapted to have impulses recorded thereon, means for moving said carrier means at a constant velocity, recording means responsive to the firing of the anti-aircraft gun for recording an impulse on said record carrier at the time a projectile is fired from the gun, reproducing means spaced from said recording means and arranged along said record carrier means for producing and emitting an electrical output impulse from said recorded impulse after the same has been moved along an adjustable length of path by said sound carrier means, and varying means for varying the length of said predetermined path; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during flight time; and photographic recording means oriented at said target jointly with said aiming device and responsive to said emitted output impulse for recording the position of the projectile relative to said moving target when said output impulse is emitted from said storing means.

9. Apparatus for testing the accuracy of anti-aircraft guns firing projectiles at a target moving along a flight path by recording the position of the fired projectile as it intersects the flight path of the moving target, comprising, in combination, at least one gun aiming device controlling the aiming of the anti-aircraft gun being tested at the moving target as it moves along its flight path and providing at least three electrical output signals, two of said output signals corresponding respectively to the azimuthal and elevational angles of the instantaneous position of the moving target with respect to the position of the gun being tested, said third electrical output signal corresponding to the distance between the position of the gun and said instantaneous position of the moving target; impulse storing means responsive to the firing of the anti-aircraft gun for producing an impulse at the time a projectile is fired from the gun and for storing said impulse during a storing time interval, said storing means emitting an output impulse at the end of said storing time interval; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during flight time so that said storing time interval equals the computed time of flight of the projectile between said gun and the target point defined by said coordinates; and photographic recording means oriented at said target jointly with said aiming device and responsive to said emitted output impulse for recording, at the end of said storing time interval, the position of the projectile relative to said moving target.

10. Apparatus for testing the accuracy of anti-aircraft guns firing projectiles at a target moving along a flight path by recording the position of the fired projectile relative to the flight path of the moving target, comprising, in combination, means for visually producing the mirror image of the moving target as the same moves along its flight path; at least one gun aiming device controlling the aiming of the anti-aircraft gun being tested at said mirror image of the moving target as it moves along its flight path; a second aiming device continuously aimed at said moving target as the same moves along its flight path and providing electrical signals corresponding respectively to the coordinates of the instantaneous position of the mirror image of moving target with respect to the position of the gun being tested; impulse storing means responsive to the firing of the anti-aircraft gun for producing an impulse at the time a projectile is fired from the gun and for storing said impulse during a storing time interval, said storing means emitting an output impulse at the end of said storing time interval; computer means responsive to said electrical signals produced by said gun aiming device for controlling said storing time interval of said storing means in a preselected manner dependent upon said electrical signals; and recording means responsive to said emitted output impulse for recording, at the end of said storing time interval, the position of the projectile relative to said moving target.

11. Apparatus for testing the accuracy of anti-aircraft guns firing projectiles at a target moving along a flight path by recording the position of the fired projectile relative to the flight path of the moving target comprising, in combination, means for visually producing the mirror image of the moving target as the same moves along its flight path; at least one gun aiming device controlling the aiming of the anti-aircraft gun being tested at said mirror image of the moving target as it moves along its flight path; a second aiming device continuously aimed at said moving target as the same moves along its flight path and providing electrical signals corresponding respectively to the coordinates of the instantaneous position of the mirror image of moving target with respect to the position of the gun being tested; impulse storing means including an endless record carrier means adapted to have impulses recorded thereon, means for moving said carrier means at a constant velocity, recording means responsive to the firing of the anti-aircraft gun for recording an impulse on said record carrier at the time a projectile is fired from the gun, reproducing means spaced from said recording means and arranged along said record carrier means for producing and emitting an electrical output impulse from said recorded impulse after the same has been moved along a predetermined path by said sound carrier means, and varying means for varying the length of said predetermined path; computer means responsive to said electrical signals produced by said gun aiming device for controlling said varying means of said storing means in a preselected manner dependent upon said electrical signals; and recording means responsive to said emitted output impulse for recording the position of the projectile relative to said moving target when said output impulse is emitted from said storing means.

12. Apparatus for testing the accuracy of anti-aircraft guns firing projectiles at a target moving along a flight path by recording the position of the fired projectile relative to the flight path of the moving target, comprising, in combination, means for visually producing the mirror image of the moving target as the same moves along its flight path; at least one gun aiming device controlling the aiming of the anti-aircraft gun being tested at said mirror image of the moving target as it moves along its flight path; a second aiming device continuously aimed at said moving target as the same moves along its flight path and providing electrical signals corresponding respectively to the coordinates of the instantaneous position of the mirror image of moving target with respect to the position of the gun being tested; impulse storing means responsive to the firing of the anti-aircraft gun for producing an impulse at the time a projectile is fired from the gun and for storing said impulse during a storing time interval, said storing means emitting an output impulse at the end of said storing time interval; computer means responsive to said electrical signals produced by said gun aiming device for controlling said storing time interval of said storing means in a preselected manner dependent upon said electrical signals; and recording means continuously focussed by said second aiming device at said mirror image of said moving target and being responsive to said emitted output impulse for recording, at the end of said storing time interval, the position of the projectile relative to said moving target.

13. Apparatus as claimed in claim 1 wherein said impulse storing means includes in combination support means; a threaded shaft rotatably mounted on said support means; a roller supporting member threadedly engaging said shaft and being movable along said shaft as said shaft is rotated; a plurality of roller means rotatably mounted on said support means, at least some of said roller means being mounted on said roller supporting member; endless record carrier means arranged on said support means and in engagement with each of said roller means for maintaining said record carrier means under a preselected tension; a recording head for recording an impulse on said record carrier means; and a reproducing head spaced from said recording head and arranged along said record carrier means for producing an output impulse from the recorded impulse after the same has been moved along an adjustable length of a predetermined path by said record carrier means, said predetermined path including at least one of the rollers mounted on said roller supporting member whereby the length of said predetermined path may be varied by rotating said rotatable shaft and still maintaining said record carrier means under said preselected tension.

14. Apparatus for testing the accuracy of anti-aircraft guns firing projectiles at a target moving along a flight path by recording the position of the fired projectile relative to the flight path of the moving target, comprising, in combination, at least one gun aiming device controlling the aiming of the anti-aircraft gun being tested at the moving target as it moves along its flight path and providing electrical signals corresponding respectively to the coordinates of the instantaneous position of the moving target with respect to the position of the gun being tested; impulse generating means for producing one electrical output impulse each time that the anti-aircraft gun fires a preselected number of projectiles; impulse storing means responsive to the output impulse of said impulse generating means and for storing said impulse during an adjustable storing time interval, said storing means emitting a second output impulse at the end of said storing time interval; computer means responsive to said electrical signals produced by said gun aiming device for determining an initial value of said storing time interval dependent upon said electrical signals corresponding respectively to said coordinates of the position of said target at the time of firing, and for adjusting said initial storing time interval during the flight time of said projectile dependent on variations of said electrical signals respectively corresponding to respectively varying coordinates of the instantaneous positions of said target as they vary during flight time; and photographic recording means oriented at said target jointly with said aiming device and responsive to said second output impulse for recording, at the end of said storing time interval as adjusted, the position of the projectile relative to said moving target.

References Cited in the file of this patent
UNITED STATES PATENTS

| | | |
|---|---|---|
| 1,732,718 | Gluer | Oct. 22, 1929 |
| 2,655,649 | Williams | Oct. 13, 1953 |
| 2,773,732 | Roberts et al. | Dec. 11, 1956 |
| 2,775,756 | Bracy et al. | Dec. 25, 1956 |
| 2,843,028 | Ward et al. | July 15, 1958 |